_3,682,847_
PROCESS FOR THE PRODUCTION OF POLYAMIDE FOAM
Heinrich Gilch, Bonn-Ippendorf, Walter Damsky, Krefeld-Bockum, and Klaus Reinking, Krefeld, Germany, assignors to Farbenfabriken Bayer Aktiengesellschaft, Leverkusen, Germany
No Drawing. Filed Dec. 17, 1969, Ser. No. 885,951
Claims priority, application Germany, Jan. 10, 1969, P 19 01 031.2
Int. Cl. C08j _1/16_
U.S. Cl. 260—2.5 N          11 Claims

ABSTRACT OF THE DISCLOSURE

Process for the production of polyamide foam by dissolving under pressure a gas in a polymerisable mixture of a lactam, a basic catalyst and an activator, heating this reaction mass to polymerisation temperature, releasing the pressure of the reaction mass, and thereafter finally polymerising the reaction mass in a mould.

---

Process for the production of polyamide foam

The invention relates to a process for the production of polyamide foam.

It is known that polyamide foams can be produced by polymerising lactams in the presence of bases such as alkali metal lactams and an activator such as an acylated lactam, together with materials such as azides which form gas or which liberate gas. It has also been proposed that gases such as nitrogen should be introduced during the polymerisation. Both processes, however, yield very uneven foams which contain large pores. Such processes are very difficult to reproduce owing to the short polymerisation time.

It is also known that polyamide foams can be produced by heating while stirring a foamable mixture, as described in U.S. Pat. 3,382,195, British Pat. 1,112,515 and Belgian Pats. 701,945 and 722,514. According to Canadian Pat. 803,579, an apparatus is used in this process which consists of a melting tank, a pump and a reaction chamber equipped with a stirrer. The mixture is introduced into the reaction chamber by means of the pump, at temperatures which are just above the melting point of the mixture, so that a preliminary foaming takes place. The diisocyanates are converted into polycarbodiimides, with liberation of carbon dioxide, and by cyclisation into polyfunctional isocyanates. If this reaction is carried out with vigorous stirring, a creamy liquid with a slightly elevated viscosity is produced. This flows through an overflow channel into a mould where it polymerises and foams.

It is an object of this invention to provide a process for the production of polyamide foam that avoids the disadvantages mentioned above.

This object is accomplished by a process which comprises dissolving under pressure a gas in a molten polymerisable mixture consisting of a lactam, a basic catalyst and an activator, heating the reaction mass thus obtained to polymerisation temperature and releasing the pressure of said reaction mass at that temperature and thereafter finally polymerising the reaction mass in a mould. Thus it has been found that the turbulence, which is extremely important in all processes for the production of finely porous foams, can be achieved by saturating the polymerisable mixture with gas under pressure and releasing the pressure in the mixture during the prepolymerisation, the prepolymerisation being best carried in tubes of relatively small diameter. Both stirring of the mixture and delivery of the mixture by pumps then become unnecessary. The gas fulfils three functions, namely the delivery of the reaction material, the production of turbulence during the prepolymerisation by the release of pressure and consequent bubble formation, and the function of a blowing agent for the foam. The turbulence is further increased by the increased flow velocity which results from the expansion. It is advantageous to select the dimensions of the reaction tube so that the flow velocities do not drop below 0.5 m./sec.

One important advantage of the process of the invention compared with the known process of stirring nitrogen into the lactam melt, is that an extremely finely porous foam is obtained. Furthermore, this process is completely reproducible.

To carry out the process, a mixture, which is stable at the melting temperature of the lactam and is suitable for ionic polymerisation and which consists of a lactam, a basic catalyst and an activator is saturated with a gas under pressure just above the melting point of the lactam. The liquid is forced by the gas pressure through a valve at the bottom of the apparatus into a heated tube in which prepolymerisation commences. The rapid pressure drop causes fine bubbles to form, which results in high turbulence during the prepolymerisation. The reaction mixture thereupon flows into a heated or insulated mould in which the mass undergoes complete polymerisation and foams up simultaneously.

The temperature of the reaction mixture may be in the region of from 70° to 110° C. It is preferable to employ a temperature which is slightly above the melting point of the lactam.

In principle, any mixtures of lactam, activator and catalyst, which are capable of ionic polymerisation and which are stable at the melting temperature for a certain length of time, and which rapidly undergo complete polymerisation when heated to elevated temperatures, may be used for the process of the invention. Examples of lactams are $\epsilon$-caprolactam and lauric lactam, $\epsilon$-caprolactam being particularly suitable. Activators which may be used are the known N-acylated lactams such as acetyl lactam and addition products of isocyanates with lactams. The usual basic catalysts may be used in the foaming process such as alkali metal lactams or salt-forming substances and also in particular comparatively weak bases such as the alkali metal or alkaline earth metal salts of carboxylic acids which yield more stable mixtures.

The most suitable polymerisation mixtures, however, are those in which an isocyanate is used in such quantities that it acts both as an activator and as a blowing agent, i.e. an amount of isocyanate of at least 1 mol percent based on the lactam is preferably used, the molar ratio of isocyanate to basic alkali metal or alkaline earth metal compound being preferably greater than 5:1. If polyisocyanates such as hexamethylene diisocyanate, 4,4'-diphenyl-methane diisocyanate and toluylene diisocyanate are used, polycarbodiimides, which are linked by isocyanate units are produced, carbon dioxide being split off. This reaction takes place in the reaction tube as described above, in which bubbles are formed due to the release of pressure which takes place at the same time, and this bubble formation is further increased by the formation of carbon dioxide. Intensive turbulence is thereby produced which is further increased by the high flow velocity.

Due to a certain increase in viscosity caused by the formation of the polycarbodiimide, a relatively stable, creamy mass is produced, which, on leaving the reaction tube undergoes complete polymerisation and foaming in a preheated or insulated mould.

Catalysts which are particularly suitable are the alkali metal salts of carboxylic acids, such as formic acid, because mixtures with such catalysts are stable even at the melting temperature of the lactam.

In the process according to the invention, any gas which is soluble in the lactam and unreactive towards the mixture may, in principle, be used. If weak bases such as alkali metal salts of carboxylic acids are used as catalysts, carbon dioxide is especially suitable as the gas. Carbon dioxide reacts with stronger bases such as alkali metal lactam or sodium borohydride. This difficulty can be overcome, either by using an inert gas such as nitrogen, or by saturating the lactam activator melt with carbon dioxide and only at this point mixing it with the catalyst in the reaction tube. The catalyst can be forced into the reaction tube under pressure, using an inert gas.

The density of the foam can be modified by the saturation pressure and by choosing gases of comparatively high solubility in lactams. Foams which have a density of 0.05 to 0.95 g./cm.$^3$ and preferably 0.1 to 0.7 g./cm.$^3$ can be produced by the process according to the invention. Compared with the known processes, polyamide foams of lower density can be produced with a given quantity of blowing agents (e.g. isocyanates), or the use of additional blowing agents can be dispensed with. The polyamide foams produced by the process of the invention can be used wherever good thermal and mechanical properties are required, in addition to give rise to good insulating properties.

The following examples are to further illustrate the invention without limiting it.

EXAMPLE 1

A mixture of 20 kg. of caprolactam, 140 g. of sodium formate and 20 g. of silica gel (according to Stahl) is heated to 200° C. until the sodium formate has dissolved, and it is then cooled to 70 to 80° C. with vigorous stirring so that sodium formate precipitates in a finely divided form. 800 g. of hexamethylenediiscoyanate and 20 g. of a polysilicone polyether block polymer are added as a pore regulator. The melt is subjected to treatment with a cooling roller, and is subsequently peeled off.

6 kg. of the resulting mixture are melted with stirring in a steam heated tank. The melt is saturated with carbon dioxide under a pressure of 2 excess atmospheres at a temperature of between 90 and 100° C. The bottom valve is then opened and the melt flows into a steel tube which has a diameter of 1.5 mm. and a length of 1.50 m. A 1.0 m. length of the tube is kept at about 200° C. and the subsequent 0.40 m. length of the tube at 240° C. by means of electrical resistance heating. At a throughput of 10 kg./hour, the outflow temperature is about 220° C. The melt enters a mould heated to 210° C. in which it polymerises with foaming. The density of the foam thus obtained is 0.23 g./cm.$^3$.

EXAMPLE 2

The same process is employed as in Example 1, but the melt is saturated with $CO_2$ at 5 excess atmospheres instead of at 2 excess atmospheres. The foams have a density of 0.12 g./cm.$^3$.

EXAMPLE 3

The same process is employed as in Example 1, but instead of using carbon dioxide, the melt is saturated with nitrogen at 3 excess atmospheres. The foams have a density of 0.28 g./cm.$^3$.

EXAMPLE 4

The same process is employed as in Example 1, but only 70 g. of sodium formate and 150 g. of hexamethylene diisocyanate are used for preparing the foaming mixture. The mixture is saturated with nitrogen at 1 excess atmosphere and foamed up as in Example 1. The density of the foam thus obtained is 0.8 g./cm.$^3$.

What we claim is:

1. A process for the production of polyamide foam which comprises the steps of
    (A) preparing a molten polymerizable mixture by dissolving an inert gas under pressure in a molten mixture consisting essentially of
        (1) a lactam selected from the group consisting of capro- and lauric lactam;
        (2) a basic catalyst selected from the group consisting of alkali metal lactams, alkali metal and alkaline earth metal salts of carboxylic acids, and sodium borohydride; and
        (3) an activator selected from the group consisting of N-acylated lactams and addition products of isocyanates with lactams, hexamethylene-, 4,4'-diphenylmethane-, and toluylene diisocyanate;
    (B) forcing said molten polymerizable mixture by gas pressure into a heated tube;
    (C) heating the molten polymerizable mixture in said heated tube to polymerization temperature;
    (D) releasing the pressure of said polymerizable mixture at that temperature;
    (E) introducing the polymerizable mixture into a mould; and
    (F) polymerizing the molten polymerizable mixture in a mould.
2. The process of claim 1, wherein said gas is dissolved at a temperature slightly above the melting temperature of said lactam.
3. The process of claim 1, wherein said heating to polymerisation temperature and said releasing of pressure are effected in a tube at flow velocities of over 0.5 m./sec.
4. The process of claim 1, wherein said activator is an organic diisocyanate.
5. The process of claim 1, wherein said basic catalyst is an alkali metal salt of a carboxylic acid.
6. The process of claim 4, wherein said organic diisocyanate is hexamethylene diisocyanate.
7. The process of claim 4, wherein said organic diisocyanate is diphenylmethane-4,4'-diisocyanate.
8. The process of claim 4, wherein said organic diisocyanate is toluylene diisocyanate.
9. The process of claim 1, wherein said gas is carbon dioxide.
10. The process of claim 1, wherein said gas is nitrogen.
11. The process of claim 4, wherein said organic diisocyanate is used in an amount of at least 1 mol percent based on the lactam.

References Cited

UNITED STATES PATENTS

| | | | |
|---|---|---|---|
| 3,345,340 | 10/1967 | Brouns | 260—2.5 N |
| 2,928,130 | 3/1960 | Gray | 260—2.5 E |
| 3,214,234 | 10/1965 | Bottomley | 260—2.5 E |
| 3,309,343 | 3/1967 | Darnell et al. | 260—78 L |

SAMUEL H. BLECH, Primary Examiner

M. FOELAK, Assistant Examiner

U.S. Cl. X.R.

264—50, 328, Dig. 56